Patented July 10, 1934

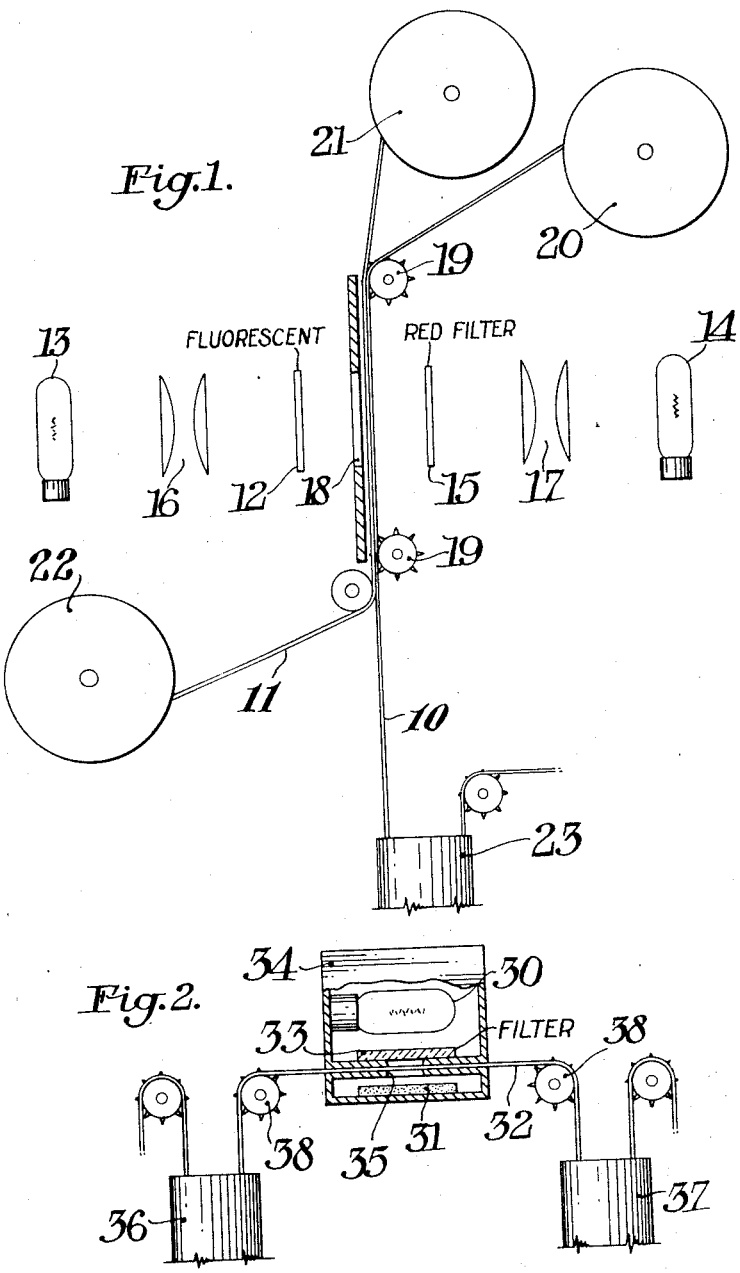

1,966,322

UNITED STATES PATENT OFFICE 1,966,322

METHOD AND APPARATUS FOR PHOTOGRAPHIC PRINTING

Clifton M. Tuttle, Rochester, N. Y., assignor to Eastman Kodak Company, Rochester, N. Y., a corporation of New York Application January 23, 1932, Serial No. 588,459

7 Claims. (Cl. 95—75)

This invention relates to photography and more particularly to the automatic printing of photographic copies in a negative-positive process and a reversal process.

It has long been known that when printing a series of negatives of different values of average transmission, as good or better average results are obtained if the intensity of the printing light is so regulated that the product of this intensity and the average transmission remains constant, as when the exposures are determined by the judgment of experienced operators.

It is an object of this invention to provide a method and apparatus for the automatic regulation of light intensity in photographic printing in accordance with the average transmission of the record being printed, which has no moving parts and which is inherently self correcting.

It is well known that fluorescence of some substances as, for instance, activated zinc sulphide, may be excited by light, the amount of fluorescence being proportional to the amount of exciting radiation. It is also well known that heat rays and red light accelerate decay of fluorescence excited as above described.

This invention makes use of fluorescent substances in a special manner to automatically control the exposure given in photographic printing processes.

The invention as applied to a negative-positive printing process comprises in general an arrangement in which the printing exposure is supplied by a fluorescent screen excited by light from a source of constant intensity. The intensity of the radiation emitted by the fluorescent screen, and therefore the intensity of the printing light, is controlled by passing non-actinic light through the positive and negative to the fluorescent screen, causing fluorescence to decay in accordance with the density of the negative film being printed.

The invention as applied to the control of the second exposure in a reversal process may be practiced by passing light from a source of constant intensity through the bleached image and upon a fluorescent screen positioned in close proximity to one surface of the image. The radiation emitted by the screen is utilized to administer the second exposure, the amount of which is controlled by the intensity of the exciting radiation transmitted by the image.

The present invention will be readily understood from the following description when read in connection with the accompanying drawing in which:—

Fig. 1 shows diagrammatically one arrangement for printing a positive from a negative in accordance with the invention; and, Fig. 2 shows diagrammatically an arrangement for giving the second exposure in a reversal process.

The arrangement shown in Fig. 1 for printing a positive 10 from a negative 11 comprises a screen 12 of some suitable fluorescent material, as, for instance, zinc sulphide. A constant source of light 13 is adapted to excite fluorescence in the screen 12 to furnish the light for printing the positive 10. The average transmission of the negative film 11 is used to control the printing exposure in the following manner: A source 14 of long wave length radiation, preferably in the infra-red portion of the spectrum, is positioned to transmit non-actinic radiation through the positive 10, the negative 11 to the fluorescent screen 12.

This non-actinic light causes decay of the fluorescence of the screen 12 proportional to its intensity which is in turn determined by the density of the negative 11, thereby controlling the exposure given the positive film 10 in accordance with the density of the negative film 11. In order to prevent any radiation of a short wave length from reaching the positive film 10 a suitable filter 15 is positioned in front of the long wave length source 14. Condensers 16 and 17 may be employed to direct the light rays to the screen 12 and the filter 15 respectively.

For printing motion picture film a suitable arrangement for advancing the negative film 11 and the positive film 10 past a printing gate 18 may comprise feed sprockets 19 driven by any suitable source of power, not shown, which are adapted to advance the positive film 10 from a reel 20 and the negative film from a reel 21 at a uniform rate past the printing gate 18, after which the negative film 11 is taken up on a suitable reel 22 and the exposed positive film 10 is carried through any suitable processing tank 23. The size of the gate 18 and the rate of movement of the films 10 and 11 being constant, it is evident that the time, during which any given portion of the positive film 10 is exposed, is constant and since, as above described, the intensity of the exposing light is varied in accordance with the average transmission of the negative film 11, each portion of the positive film 10 receives the proper amount of exposure.

The principle underlying the automatic exposure control for the negative-positive printing process described in connection with Fig. 1 is also applicable to the control of the second exposure in a photographic reversal process.

An arrangement suitable for controlling the second exposure in such a process is shown in Fig. 2 as comprising a light source 30 of constant intensity for activating a fluorescent material 31 through a film 32 carrying a bleached image to which is to be given a second exposure. The intensity of the radiation emitted by the fluorescence of the material 31 is proportional to the intensity of the exciting radiation transmitted by the film 32 and therefore proportional to the density of the image carried by the film 32. This condition is the desired one, for in preparing the positive image by a reversal process, the greater the transmission of the bleached image the greater the exposure required to produce a positive image of the desired density.

It is generally desirable to regulate or control the quality of the radiation falling upon the bleached film 32 and this may be accomplished by inserting in the light beam a suitable filter 33. If the emulsion on the film is predominately sensitive to blue and red light, the filter 33 may pass blue light and excite the fluorescent material 21 to emit red light. In this event the blue light passing through the film 32 administers a part of the exposure and the red light emitted by the fluorescent material 31 completes the exposure. From this it is obvious that the total exposure given the bleached image on the film 32 is a function of the intensity of the radiation emitted by the fluorescent material 31 which in turn is controlled by the average transmission of the bleached image.

If it is desired to adminster the exposure entirely by means of the fluorescent material 31 it is necessary only to make the filter 33 of a material which will pass light of a wave length which will not affect the sensitive emulsion on the film 32 but which will excite the fluorescent material 31 to emit radiation to which the emulsion is sensitive.

This may be accomplished by using a filter which will pass green light only, the emulsion being substantially insensitive to green light, in which event the fluorescent material 31 will emit radiations of a longer wave length, as red, to which the emulsion is sensitive and the exposure will be automatically controlled as described above.

The last mentioned arrangement depends for its operativeness upon the use of an emulsion sensitive to a band of the longer wave lengths and apparently could not be used successfully with ordinary emulsions, that is, emulsions which are most sensitive to the blue and violet. However, there are certain fluorescent substances such as magdala red having the property of emitting radiation of a wave length shorter than the wave length of the exciting illumination. The use of such a fluorescent substance makes it possible to excite the screen with non-actinic light through the bleached image and to administer the entire exposure to an ordinary emulsion with actinic light emitted by the fluorescent screen.

In Fig. 2 is shown one arrangement suitable for administering the second exposure to a motion picture film comprising a housing 34 enclosing the exposure controlling element and having a printing window 35 past which the film 32 is advanced from one processing tank 36 to another processing tank 37 by means of sprockets 38.

It is obvious that with any of the arrangements described in connection with Fig. 2 the amount of exciting radiation reaching the fluorescent screen 31 varies in accordance with the transmission of the image carried by the film and therefore the effective exposure is controlled by the transmission of this image.

It is to be understood that in each of the above arrangements suitable housings confine the printing light so as to affect the sensitive film only at the printing gate.

I consider as within my invention all such modifications and equivalents as fall within the scope of the appended claims.

What I claim as new and desire to secure by Letters Patent of the United States is:—

1. The method of printing a photographic record by means of a fluorescent screen which comprises illuminating the fluorescent screen, advancing the photographic record and a sensitive layer past said screen, and simultaneously illuminating said screen through said record and the sensitive layer with light rays having the property of diminishing the fluorescence of said screen.

2. The method of printing a photographic record on a sensitive layer by means of a fluorescent screen which comprises continuously activating the fluorescent screen, varying uniformly the intensity of the radiation emitted by the screen in accordance with the average transmission of the record being printed and simultaneously utilizing the radiation emitted by the screen to administer at least a part of an exposure to the sensitive layer.

3. The method of printing a photographic record on a sensitive layer by means of a fluorescent screen which comprises continuously activating the fluorescent screen, varying the intensity of the radiation emitted by the screen in accordance with the average transmission of the record being printed and simultaneously exposing the sensitive layer through the record to the radiation emitted by the screen.

4. The method of controlling the exposure given in a negative-positive printing process which comprises exciting with light of constant intensity a fluorescent material to provide a source of printing light, exposing for a fixed time the positive through the negative to the light emitted by the fluorescent material and simultaneously controlling the intensity of the radiation emitted by the material in accordance with the average transmission of the negative film.

5. The method of controlling the exposure given to the bleached image in a photographic reversal process which comprises simultaneously exciting the fluorescent material to provide a source of printing light, exposing the bleached image to diffuse light emitted by the fluorescent material and varying the intensity of the exciting radiation in accordance with the average transmission of the bleached image being exposed.

6. In a photographic printing apparatus, the combination with means for advancing positive and negative film through the apparatus, of fluorescent means for effecting the exposure of the positive film through the negative film, means for illuminating the fluorescent means with light of constant intensity and means for simultaneously illuminating said fluorescent means through the negative film with light having the property of diminishing the fluorescence of said fluorescent means.

7. In a photographic printing process, the method of automatically controlling the intensity of the printing light in accordance with the characteristics of the record being printed which comprises continuously activating a fluorescent screen, varying uniformly the intensity of the radiation emitted by the screen in accordance with the average transmission of the record being printed and simultaneusly utilizing the radiation emitted by the screen to administer at least a part of an exposure to the sensitive layer.

CLIFTON M. TUTTLE.